United States Patent
Bodinet

(10) Patent No.: US 10,742,924 B2
(45) Date of Patent: *Aug. 11, 2020

(54) SYSTEMS AND METHODS FOR BIDIRECTIONAL SPEED RAMPING

(71) Applicant: GoPro, Inc., San Mateo, CA (US)

(72) Inventor: Joshua Bodinet, San Diego, CA (US)

(73) Assignee: GoPro, Inc., San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/972,600

(22) Filed: May 7, 2018

(65) Prior Publication Data

US 2018/0255268 A1    Sep. 6, 2018

Related U.S. Application Data

(63) Continuation of application No. 15/183,667, filed on Jun. 15, 2016, now Pat. No. 9,967,515.

(51) Int. Cl.
*H04N 5/783*    (2006.01)
*H04N 5/91*     (2006.01)
*G11B 27/00*    (2006.01)
*G11B 27/19*    (2006.01)

(52) U.S. Cl.
CPC .......... *H04N 5/783* (2013.01); *G11B 27/005* (2013.01); *G11B 27/19* (2013.01); *H04N 5/91* (2013.01)

(58) Field of Classification Search
CPC .............................. H04N 5/783; G11B 27/005
See application file for complete search history.

(56) References Cited

U.S. PATENT DOCUMENTS

| | | |
|---|---|---|
| 6,633,685 B1 | 10/2003 | Kusama |
| 7,512,886 B1 | 3/2009 | Herberger |
| 7,885,426 B2 | 2/2011 | Golovchinsky |
| 7,970,240 B1 | 6/2011 | Chao |

(Continued)

FOREIGN PATENT DOCUMENTS

| | | |
|---|---|---|
| JP | H09181966 A | 7/1997 |
| JP | 2005252459 A | 9/2005 |

(Continued)

OTHER PUBLICATIONS

PCT International Written Opinion for PCT/US2015/041624, dated Dec. 17, 2015, 7 Pages.

(Continued)

*Primary Examiner* — Girumsew Wendmagegn
(74) *Attorney, Agent, or Firm* — Esplin & Associates, PC

(57) ABSTRACT

Electronic information defining visual content within video frames may be accessed. Video frames may be ordered in a source sequence. Positions in the source sequence may be associated with playback directions. Video frames may be ordered in a playback sequence based on the playback directions. The playback sequence may characterize a playback order in which video frames are displayed during playback. Video frames in the playback sequence may be associated with playback speeds. The playback speeds may determine perceived speeds with which visual content is displayed during playback. Speed ramped video frames may be determined based on the playback sequence and the playback speeds. A speed ramped video may be generated based on the speed ramped video frames.

20 Claims, 7 Drawing Sheets

(56) References Cited

U.S. PATENT DOCUMENTS

| | | | |
|---|---|---|---|
| 8,180,161 B2 | 5/2012 | Haseyama | |
| 8,606,073 B2 | 12/2013 | Woodman | |
| 8,774,560 B2 | 7/2014 | Sugaya | |
| 8,971,623 B2 | 3/2015 | Gatt | |
| 8,990,328 B1 | 3/2015 | Grigsby | |
| 9,041,727 B2 | 5/2015 | Ubillos | |
| 9,142,257 B2 | 9/2015 | Woodman | |
| 9,342,376 B2 | 5/2016 | Jain | |
| 9,418,283 B1 | 8/2016 | Natarajan | |
| 9,967,515 B1* | 5/2018 | Bodinet | H04N 5/783 |
| 2002/0165721 A1 | 11/2002 | Chang | |
| 2004/0001706 A1 | 1/2004 | Jung | |
| 2005/0025454 A1 | 2/2005 | Nakamura | |
| 2005/0097614 A1* | 5/2005 | Pedlow, Jr. | H04N 7/17318 725/90 |
| 2005/0108031 A1 | 5/2005 | Grosvenor | |
| 2005/0198018 A1 | 9/2005 | Shibata | |
| 2006/0080286 A1 | 4/2006 | Svendsen | |
| 2006/0115108 A1 | 6/2006 | Rodriguez | |
| 2008/0123976 A1 | 5/2008 | Coombs | |
| 2008/0183843 A1 | 7/2008 | Gavin | |
| 2009/0019995 A1 | 1/2009 | Miyajima | |
| 2009/0027499 A1 | 1/2009 | Nicholl | |
| 2009/0125559 A1 | 5/2009 | Yoshino | |
| 2009/0252474 A1 | 10/2009 | Nashida | |
| 2010/0046842 A1 | 2/2010 | Conwell | |
| 2010/0086216 A1 | 4/2010 | Lee | |
| 2010/0161720 A1 | 6/2010 | Colligan | |
| 2010/0199182 A1 | 8/2010 | Lanza | |
| 2010/0274714 A1 | 10/2010 | Sims | |
| 2010/0318660 A1 | 12/2010 | Balsubramanian | |
| 2011/0103700 A1 | 5/2011 | Haseyama | |
| 2011/0137156 A1 | 6/2011 | Razzaque | |
| 2011/0170086 A1 | 7/2011 | Oouchida | |
| 2011/0206351 A1 | 8/2011 | Givoly | |
| 2011/0242098 A1 | 10/2011 | Tamaru | |
| 2012/0014673 A1 | 1/2012 | O'Dwyer | |
| 2012/0027381 A1 | 2/2012 | Kataoka | |
| 2012/0030263 A1 | 2/2012 | John | |
| 2012/0141019 A1 | 6/2012 | Zhang | |
| 2012/0210205 A1 | 8/2012 | Sherwood | |
| 2012/0210228 A1 | 8/2012 | Wang | |
| 2012/0246114 A1 | 9/2012 | Edmiston | |
| 2012/0283574 A1 | 11/2012 | Park | |
| 2013/0182166 A1 | 7/2013 | Shimokawa | |
| 2013/0235071 A1 | 9/2013 | Ubillos | |
| 2013/0239051 A1 | 9/2013 | Albouze | |
| 2013/0330019 A1 | 12/2013 | Kim | |
| 2014/0149865 A1 | 5/2014 | Tanaka | |
| 2014/0152762 A1 | 6/2014 | Ukil | |
| 2014/0282661 A1 | 9/2014 | Martin | |
| 2015/0039646 A1 | 2/2015 | Sharifi | |
| 2015/0071547 A1 | 3/2015 | Keating | |
| 2015/0113009 A1 | 4/2015 | Zhou | |
| 2015/0156247 A1 | 6/2015 | Hensel | |
| 2015/0287435 A1 | 10/2015 | Land | |
| 2016/0029105 A1 | 1/2016 | Newman | |
| 2016/0094601 A1 | 3/2016 | Besehanic | |
| 2016/0103830 A1 | 4/2016 | Cheong | |
| 2016/0189752 A1 | 6/2016 | Galant | |
| 2016/0260000 A1 | 9/2016 | Yamakawa | |
| 2016/0286235 A1 | 9/2016 | Yamamoto | |

FOREIGN PATENT DOCUMENTS

| | | |
|---|---|---|
| JP | 2006053694 A | 2/2006 |
| JP | 2008059121 A | 3/2008 |
| JP | 2009053748 A | 3/2009 |
| JP | 2009040538 A1 | 4/2009 |
| JP | 2011188004 A | 9/2011 |
| WO | 2006001361 A1 | 1/2006 |
| WO | 2012057623 A1 | 5/2012 |
| WO | 2012086120 A1 | 6/2012 |

OTHER PUBLICATIONS

PCT International Search Report and Written Opinion for PCT/US15/12086 dated Mar. 17, 2016, 20 pages.

Schroff et al., 'FaceNet: A Unified Embedding for Face Recognition and Clustering,' IEEE Conference on Computer Vision and Pattern Recognition (CVPR), 2016, 10 pgs.

Parkhi et al., 'Deep Face Recognition,' Proceedings of the British Machine Vision, 2015, 12 pgs.

Iandola et al., 'SqueezeNet: AlexNet-level accuracy with 50x fewer parameters and <0.5MB model size', arXiv:1602.07360v3 [cs.CV] Apr. 6, 2016 (9 pgs.).

Ioffe et al., 'Batch Normalization: Accelerating Deep Network Training by Reducing Internal Covariate Shift,' arXiv:1502.03167, 2015, 11 pgs.

He et al., 'Deep Residual Learning for Image Recognition,' arXiv:1512.03385, 2015, 12 pgs.

Han et al., Deep Compression: Compressing Deep Neural Networks with Pruning, Trained Quantization and Huffman Coding, International Conference on Learning Representations 2016, 14 pgs.

PCT International Search Report and Written Opinion for PCT/US16/31076, dated Aug. 8, 2016, 19 Pages.

Yang et al., 'Unsupervised Extraction of Video Highlights via Robust Recurrent Auto-encoders' arXiv:1510.01442v1 [cs.CV] Oct. 6, 2015 (9 pgs).

Tran et al., 'Learning Spatiotemporal Features with 3D Convolutional Networks', arXiv:1412.0767 [cs.CV] Dec. 2, 2014 (9 pgs).

PCT International Search Report for PCT/US15/41624 dated Nov. 4, 2015, 5 pages.

PCT International Search Report for PCT/US15/23680 dated Aug. 3, 2015, 4 pages.

PSonar URL: http://www.psonar.com/about retrieved on Aug. 24, 2016, 3 pages.

PCT International Preliminary Report on Patentability for PCT/US2015/023680, dated Oct. 4, 2016, 10 pages.

Nicole Lee, Twitter's Periscope is the best livestreaming video app yet; Mar. 26, 2015 URL:http://www.engadget.com/2015/03/26/periscope/ [Retrieved Aug. 25, 2015] 11 pages.

FFmpeg, "Demuxing," Doxygen, Dec. 5, 2014, 15 Pages, [online] [retrieved on Jul. 13, 2015] Retrieved from the Internet <URL: https://www.ffmpeg.org/doxygen/2.3/group_lavf_encoding.html>.

FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structAVP a ck et. html>.

Japanese Office Action for JP Application No. 2013-140131, dated Aug. 5, 2014, 6 pages.

Office Action for U.S. Appl. No. 13/831,124, dated Mar. 19, 2015, 14 pages.

* cited by examiner

SYSTEMS AND METHODS FOR BIDIRECTIONAL SPEED RAMPING

FIELD

This disclosure relates to facilitating user controlled bidirectional speed ramping of visual content during playback.

BACKGROUND

Video applications may allow a user to change playback speeds of a video based on playback time locations. Changing playback speeds of a video based on playback time locations may result in the video running out of playback content prior to the desired end points. For example, a user may change a playback speed of a video having a duration of five minutes. At the four minute mark, the user may set the playback speed of the video to be 4× speed for thirty seconds. At the four minute mark, the video only has fifteen seconds of playback content at 4× speed. The video will run out of playback content prior to the end of the desired thirty-second segment at 4× speed.

SUMMARY

This disclosure relates to bidirectional speed ramping. Electronic information defining visual content within video frames may be accessed. Video frames may be ordered in a source sequence. Positions in the source sequence may be associated with playback directions. Video frames may be ordered in a playback sequence based on the playback directions. The playback sequence may characterize a playback order in which video frames are displayed during playback. Video frames in the playback sequence may be associated with playback speeds. The playback speeds may determine perceived speeds with which the visual content is displayed during playback. Speed ramped video frames may be determined based on the playback sequence and the playback speeds. A speed ramped video may be generated based on the speed ramped video frames.

A system for bidirectional speed ramping may include one or more physical processors, and/or other components. The physical processor(s) may be configured by machine-readable instructions. Executing the machine-readable instructions may cause the physical processor(s) to facilitate bidirectional speed ramping. The machine-readable instructions may include one or more computer program components. The computer program components may include one or more of an access component, a playback direction component, a playback sequence component, a playback speed component, a speed ramped video frame component, a speed ramped video component, and/or other computer program components.

The access component may be configured to access electronic information and/or other information. The electronic information may be stored in a storage medium and/or in other locations. The electronic information may define visual content within video frames for playback. Visual content may refer to media content that may be observed visually. Visual content may include one or more videos stored in one or more formats/container, and/or other visual content. The video frames may be ordered in a source sequence. In some implementations, the source sequence may characterize a source order corresponding to a sequence in which the visual content occurred at capture.

The playback direction component may be configured to associate one or more positions in the source sequence with one or more playback directions. The playback directions may include a forward playback direction, a reverse playback direction, and/or other directions.

The playback sequence component may be configured to order the video frames in a playback sequence. The video frames may be ordered in the playback sequence based on the playback direction(s) and/or other information. The playback sequence may characterize a playback order in which one or more of the video frames in the playback sequence may be displayed during playback. Ordering the video frames in the playback sequence may include designating one or more of the video frames in the source sequence in one or more playback positions in the playback sequence.

In some implementations, ordering the video frames in the playback sequence may include designating one of the video frames in the source sequence as a first video frame in the playback sequence and designating one of the video frames in the source sequence as a last video frame in the playback sequence. In some implementations, ordering the video frames in the playback sequence may include excluding one or more of the video frames in the source sequence from the playback sequence.

The playback speed component may be configured to associate one or more of the video frames in the playback sequence with one or more playback speeds. The playback speeds may determine one or more perceived speeds with which the visual content is displayed during playback.

The speed ramped video frame component may be configured to determine speed ramped video frames to be included in one or more speed ramped videos. The speed ramped video frames may be determined based on the playback sequence, the playback speed(s), and/or other information. In some implementations, determining the speed ramped video frames may include identifying one or more playback positions in the playback sequence based on the playback speed(s) and/or other information. The playback position(s) may correspond to the speed ramped video frames.

In some implementations, determining the speed ramped video frames may include, in response to a playback position aligning with a position of a video frame in the source sequence, using the video frame in the source sequence as the speed ramped video frame. Determining the speed ramped video frames may include, in response to a playback position not aligning with a position of a video frame in the source sequence, using two of the video frames in the source sequence to determine an interpolated video frame for the playback position. Determining the speed ramped video frames may include, in response to a playback position not aligning with a position of a video frame in the source sequence, using one of the video frames in the source sequence to determine a duplicated video frame for the playback position. Determining the speed ramped video frames may include modifying one or more of the video frames to include motion blur.

The speed ramped video component may be configured to generate one or more speed ramped videos. The speed ramped video(s) may be generated based on the speed ramped video frames and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
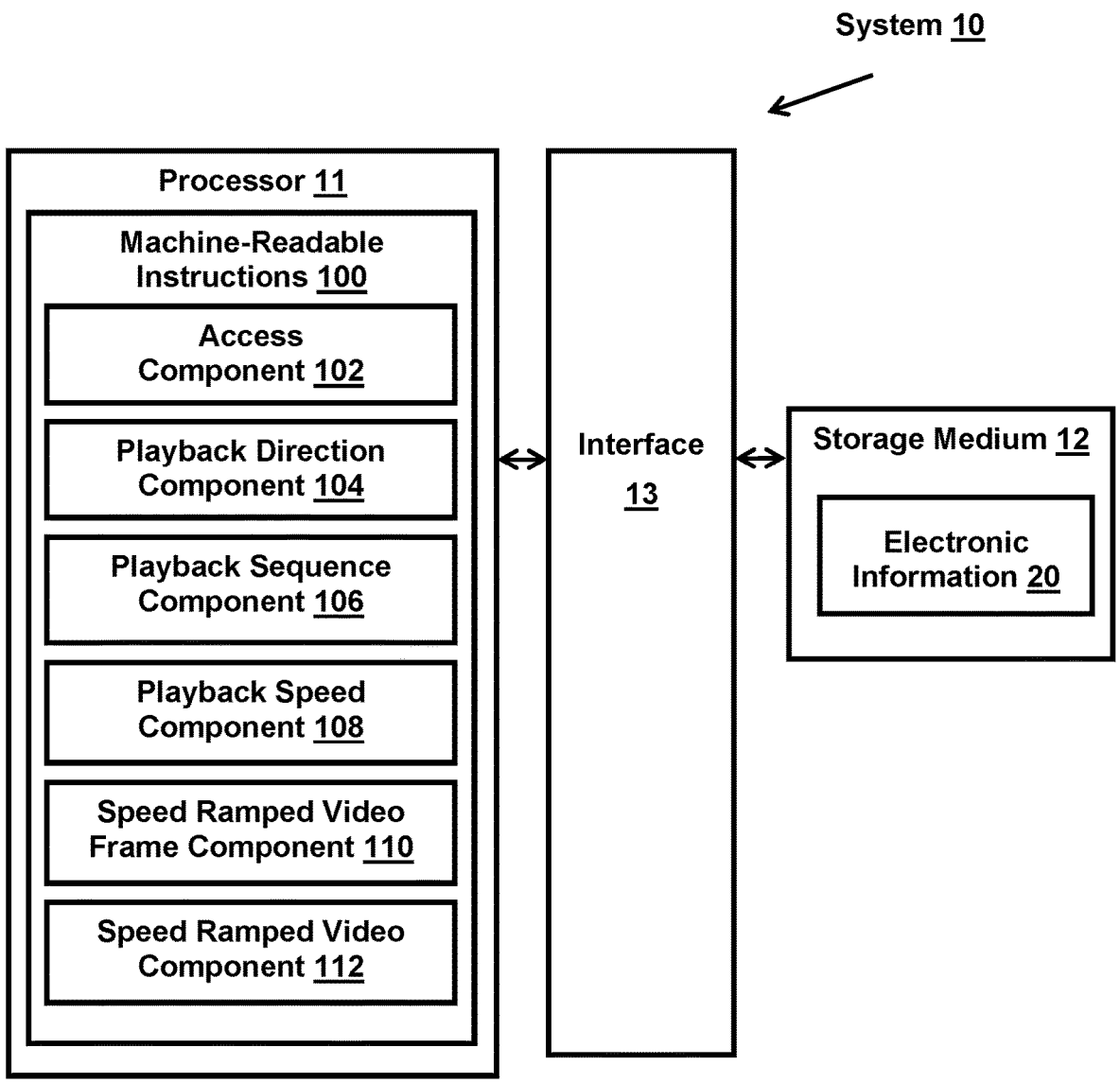
FIG. 1 illustrates a system for bidirectional speed ramping.

FIG. 1 illustrates system 10 for bidirectional speed ramping. System 10 may include one or more of processor 11, storage medium 12, interface 13 (e.g., bus, wireless interface, etc.), and/or other components. Electronic information defining visual content within video frames may be accessed by processor 11. Video frames may be ordered in a source sequence. Positions in the source sequence may be associated with playback directions. Video frames may be ordered in a playback sequence based on the playback directions. The playback sequence may characterize a playback order in which video frames are displayed during playback. Video frames in the playback sequence may be associated with playback speeds. The playback speeds may determine perceived speeds with which the visual content is displayed during playback. Speed ramped video frames may be determined based on the playback sequence and the playback speeds. A speed ramped video may be generated based on the speed ramped video frames.

Storage medium 12 may include electronic storage medium that electronically stores information. Storage medium 12 may store software algorithms, information determined by processor 11, information received remotely, and/or other information that enables system 10 to function properly. For example, storage medium 12 may store information relating to visual content, video frames, source sequence, playback directions, playback sequence, playback speeds, speed ramped video frames, speed ramped video, and/or other information. System 10 may include electronic storage separate from storage medium 12. Electronic storage separate from storage medium 12 may perform one or more of the functionalities of storage medium 12 discussed above.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine-readable instructions 100 to facilitate bidirectional speed ramping. Machine-readable instructions 100 may include one or more computer program components. Machine-readable instructions 100 may include one or more of access component 102, playback direction component 104, playback sequence component 106, playback speed component 108, speed ramped video frame component 110, speed ramped video component 112, and/or other computer program components.

Access component 102 may be configured to access electronic information 20 and/or other information. Electronic information 20 may be stored in storage medium 12 and/or in other locations. Electronic information 20 may define visual content within video frames for playback. Visual content may refer to media content that may be observed visually. Visual content may include one or more videos stored in one or more formats/container, and/or other visual content. A video may include a video clip captured by a video capture device, multiple video clips captured by a video capture device, and/or multiple video clips captured by separate video capture devices. A video may include multiple video clips captured at the same time and/or multiple video clips captured at different times. A video may include a video clip processed by a video application, multiple video clips processed by a video application and/or multiple video clips processed by separate video applications.

Figure 3:
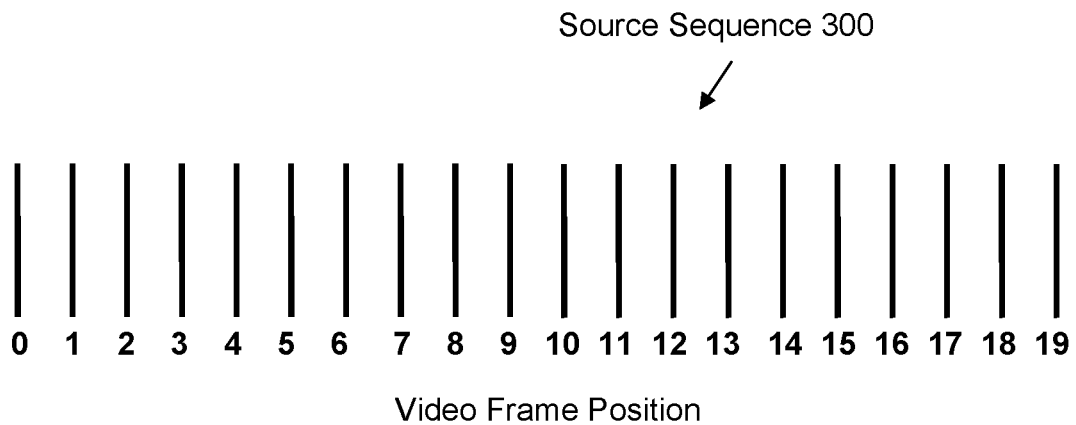
FIG. 3 illustrates an example of a source sequence.

The video frames may be ordered in a source sequence. FIG. 3 illustrates an exemplary source sequence 300. Source sequence 300 may include video frames #0-19 and/or other video frames. In some implementations, the source sequence may characterize a source order corresponding to a sequence in which the visual content occurred at capture. For example, source sequence 300 may include video frames #0-19 corresponding to a capture time interval of the visual content. Video frames #0-9 may correspond to the first half of the capture time interval of the visual content and video frames #10-19 may correspond to the second half of the capture time interval of the visual content.

In some implementations, the source sequence may characterize a source order corresponding to a sequence ordered by one or more video edits. For example, the visual content may include multiple video clips arranged in a particular order by a video application. The source sequence may characterize the order in which the video frames appear in the visual content that includes the particular arrangement of the video clips.

Figure 4:
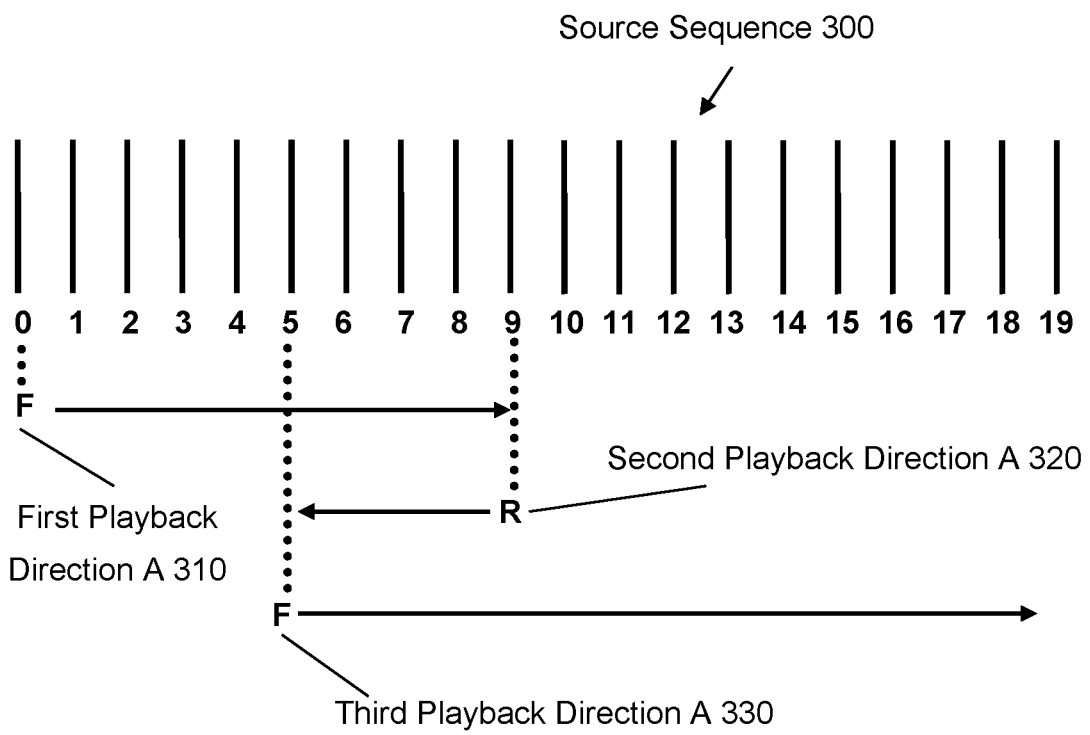
FIG. 4 illustrates examples of playback directions.

Playback direction component 104 may be configured to associate one or more positions in the source sequence with one or more playback directions. The playback directions may include a forward playback direction, a reverse playback direction, and/or other directions. For example, FIG. 4 illustrates exemplary playback positions in source sequence 300. A position in source sequence 300 corresponding to video frame #0 may be associated with first playback direction A 310. First playback direction A 310 may include a forward playback direction. A position in source sequence 300 corresponding to video frame #9 may be associated with second playback direction A 320. Second playback direction A 320 may include a reverse playback direction. A position in source sequence 300 corresponding to video frame #5 may be associated with third playback direction A 330. Third playback direction A 330 may include a forward playback direction.

Playback sequence component 106 may be configured to order the video frames in a playback sequence. The playback sequence may characterize a playback order in which one or more of the video frames in the playback sequence may be displayed during playback. For example, a playback sequence in which video frames #1-3 appear in the order of video frame #1, video frame #3, video frame #2 may characterize the playback order in which the first video frame displayed during playback is video frame #1, the second video frame displayed during playback is video frame #3, and the third video frame displayed during playback is video frame #2.

Figure 5:
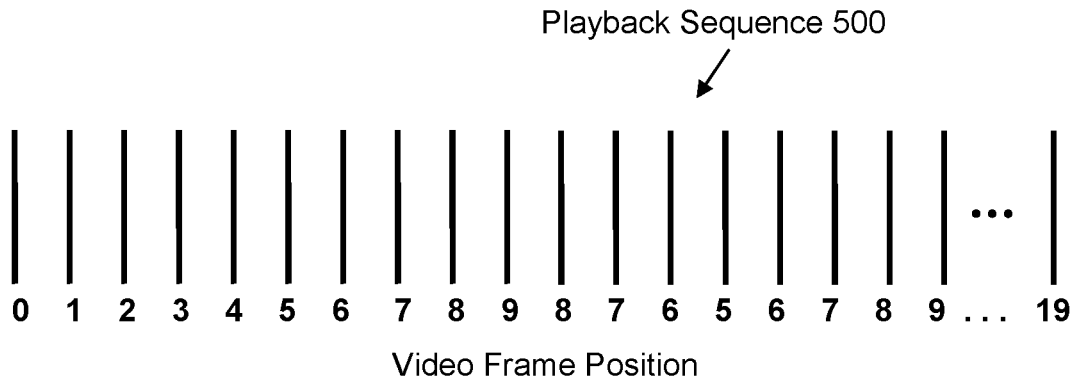
FIG. 5 illustrates an example of a playback sequence based on the playback directions shown in FIG. 4.

The video frames may be ordered in the playback sequence based on the playback direction(s) and/or other information. Ordering the video frames in the playback sequence may include designating one or more of the video frames in the source sequence in one or more playback positions in the playback sequence. For example, FIG. 5 illustrates exemplary playback sequence 500. Video frames may be ordered in playback sequence 500 based on the playback directions shown in FIG. 4. In playback sequence 500, video frames #0-9 may appear in numerical order (based on forward playback direction of first playback direction A 310). Playback sequence 500 may then include video frames #8-5 in reverse numerical order (based on reverse playback direction of second playback direction A 320). Playback sequence 500 may then include video frames #6-19 in numerical order (based on forward playback direction of third playback direction A 330)

In some implementations, ordering the video frames in the playback sequence may include designating one of the video frames in the source sequence as a first video frame in the playback sequence and designating one of the video frames in the source sequence as a last video frame in the playback sequence. For example, in FIG. 4, video frame #1 may be designated as the first video frame in playback sequence 500. Video frame #19 may be designated as the last video frame in playback sequence 500. In some implementations, the first video frame in the source sequence (e.g., video frame #0 in source sequence 300) and/or the last video frame in the source sequence (e.g., video frame #19 in source sequence 300) may be required to be the first and/or the last video frame in the playback sequence.

Figure 6:
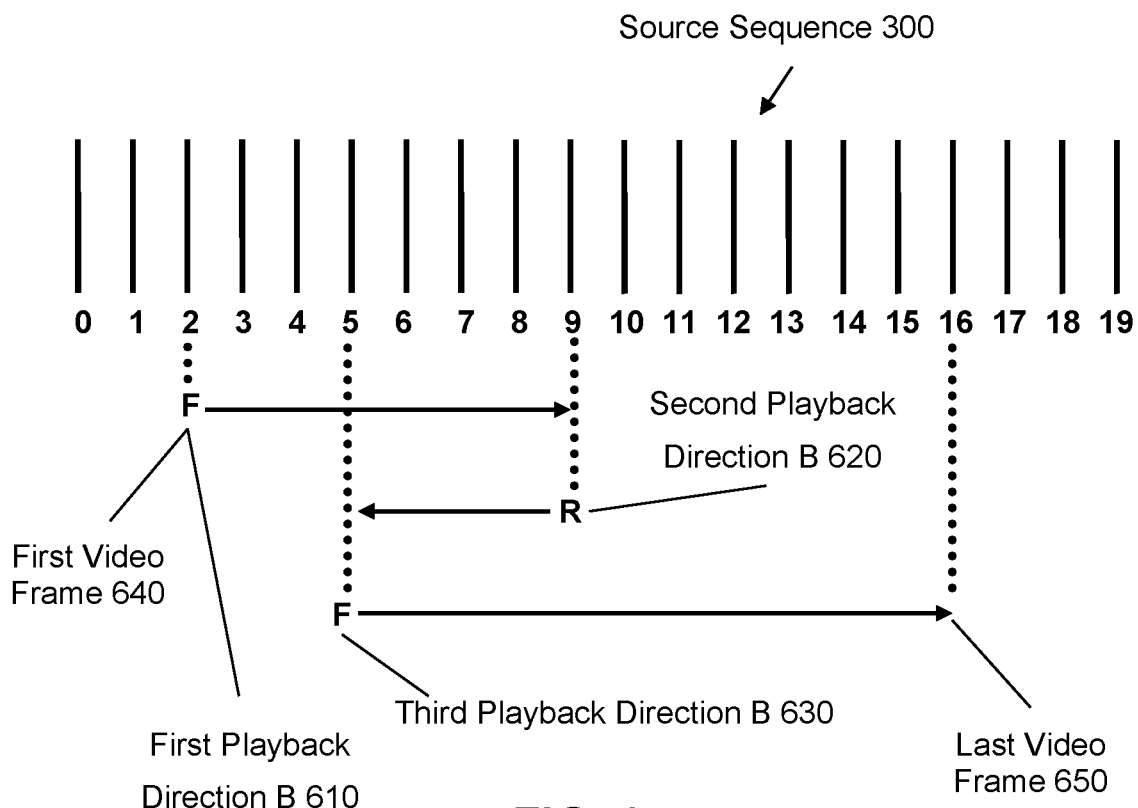
FIG. 6 illustrates an example of excluding video frames from a playback sequence.

In some implementations, ordering the video frames in the playback sequence may include excluding one or more of the video frames in the source sequence from the playback sequence. For example, FIG. 6 illustrates exemplary exclusion of video frames from a playback sequence. In FIG. 6, playback directions may include first playback direction B 610 (forward playback direction), second playback direction B 620 (reverse playback direction), third playback direction B 630 (forward playback direction), and/or other playback direction. Video frame #2 associated with the beginning of first playback direction B 610 may be designated as first video frame 640 in the playback sequence. Video frame #16 associated with the end of third playback direction B 630 may be designated as last video frame 650 in the playback sequence. Such designation of the first and last video frames in the playback sequence may result in a first portion (e.g., video frames #0-1, etc.) and a last portion (e.g., video frames #17-19, etc.) of the visual content being excluded from the playback sequence. In some implementations, one or more of the video frames excluded from the playback sequence may include one or more video frames in the middle of the source sequence. For example, in FIG. 6, one or more video frames in the middle of source sequence 300 (e.g., video frames #11-14) may be excluded from the playback sequence. The playback sequence may skip from video frame #10 to video frame #15.

Playback speed component 108 may be configured to associate one or more of the video frames in the playback sequence with one or more playback speeds. The playback speeds may determine one or more perceived speeds with which the visual content is displayed during playback. The playback speeds may allow the visual content to be displayed at a slower speed (e.g., 0.5× speed, etc.), at a default speed (e.g., 1× speed, etc.), and/or at a faster speed (e.g., 2× speed, etc.).

Figure 7A:
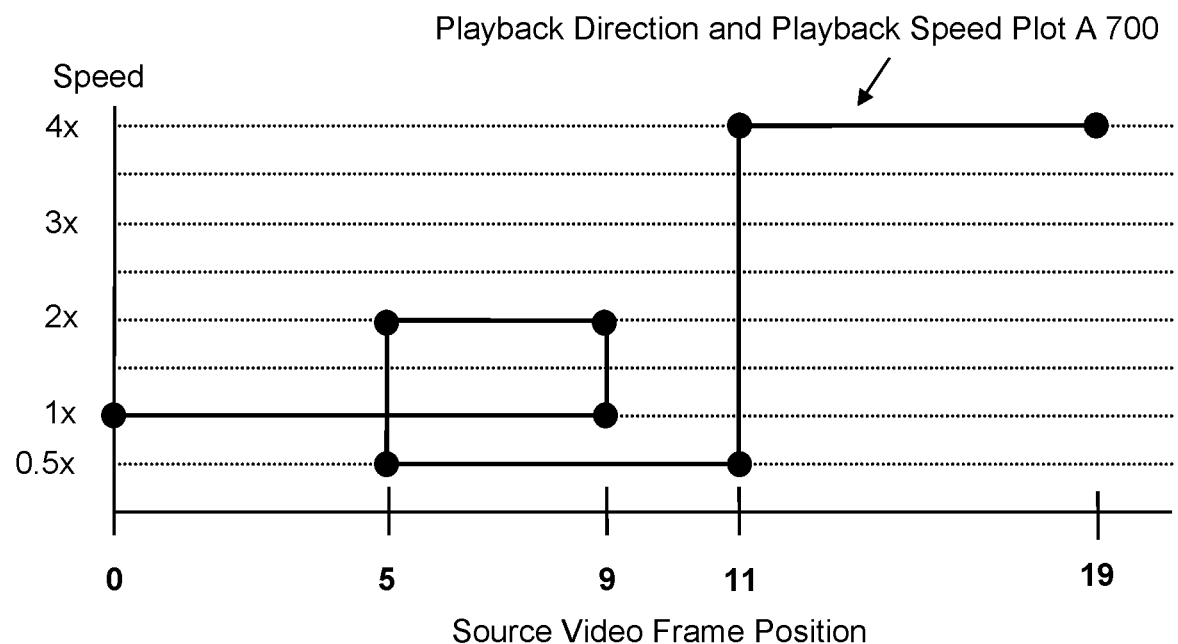
FIG. 7A illustrates an example of a playback direction and speed plot.

For example, FIG. 7A illustrates an exemplary playback direction and playback speed plot A 700. Playback direction and playback speed plot A 700 may show a plot of playback directions and playback speeds for video frames as a function of source video frame position. Source video frame positions #0-9 may be associated with a forward playback direction and a playback speed of 1× speed. Source video frame positions #9-5 may be associated with a reverse playback direction and a playback speed of 2× speed. Source video frame positions #5-11 may be associated with a forward playback direction and a playback speed of 0.5× speed. Source video frame positions #11-19 may be associated with a forward playback direction and a playback speed of 4× speed.

The use of source video frame positions to determine playback directions and/or playback speeds of a video may allow a user/system to change the playback directions and/or the playback speeds of the video without the video running out of playback content prior to the desired end points. The use of source video frame positions to determine playback directions and/or the playback speeds of a video may allow a user/system to copy, cut, paste, and/or otherwise move a portion of the video without affecting the playback directions and/or the playback speeds of the portion of the video.

Figure 7B:
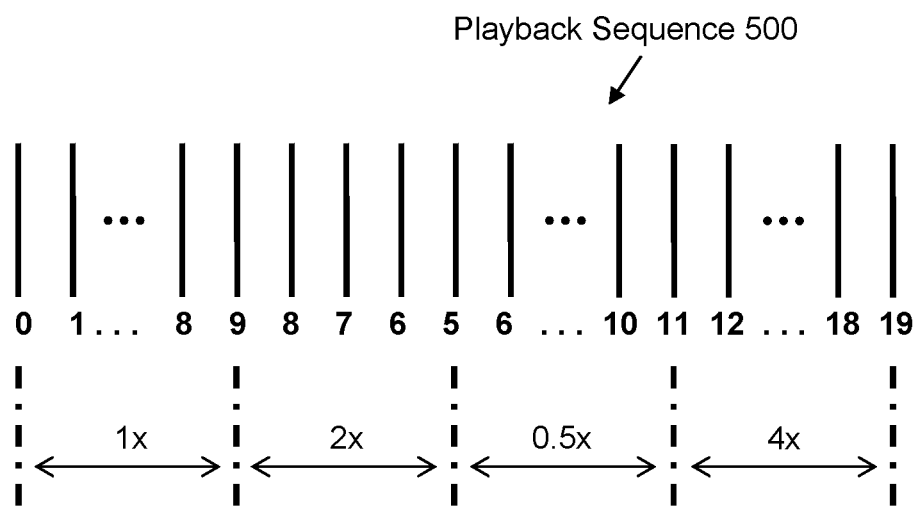
FIG. 7B illustrates examples of playback speeds for a playback sequence based on the playback direction and speed plot shown in FIG. 7A.

FIG. 7B illustrates exemplary playback speeds for playback sequence 500. Playback speeds for playback sequence 500 may be based on the playback directions and playback speeds shown in playback direction and playback speed plot A 700. In FIG. 7B, video frames #0-8 of playback sequence 500 may be associated with 1× speed. Video frames #9-6 may be associated with 2× speed. Video frames #5-10 may be associated with 0.5× speed. Video frames #11-18 may be associated with 4× playback speed.

Although speed values in playback direction and playback speed plot A 700 are shown to not vary between ranges of source video frame positions in the same playback direction (e.g., between positions #0-9, #9-5, #5-11, #11-19), this is merely for ease of reference and is not limiting. For example, playback speeds associated with video frames may change linearly and/or non-linearly. For example, playback speeds associated with video frames may include an increasing slope and/or a decreasing slope. Although speed values and playback directions in playback direction and playback speed plot A 700 are shown to change at whole number source video frame positions, this is merely for ease of reference and is not limiting. Speed values and/or playback directions may change at one or more non-whole number source video frame positions.

Figure 7C:
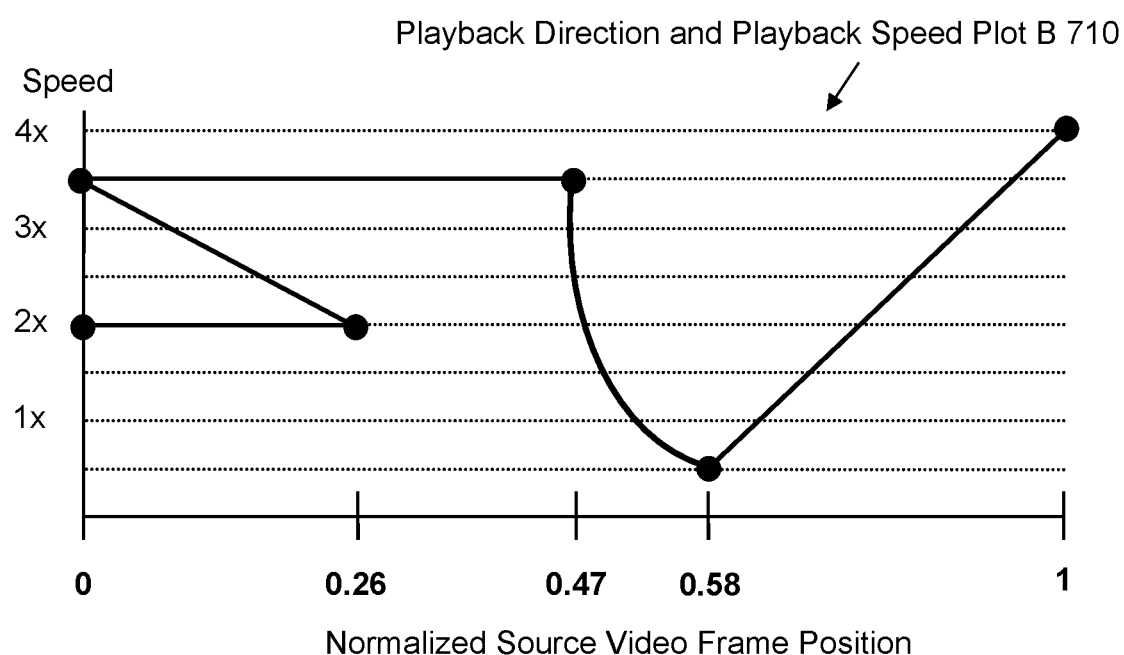
FIG. 7C illustrates an example of a playback direction and speed plot.

For example, FIG. 7C illustrates an exemplary playback direction and playback speed plot B 710 with sloping speeds. In some implementations, source video frame positions may be normalized to a value of 1 and/or other values. For example, in FIG. 7C, the source video frame position may be normalized to a value of 1. For example, source video frame positions of #0, 5, 9, 11, and 19 in FIG. 7A may correspond to normalized source video frame positions of #0, 0.26, 0.47, 0.58, and 1.

In FIG. 7C, normalized source video frame positions #0-0.26 may be associated with a forward playback direction and a playback speed of 2× speed. Normalized source video frame positions #0.26-0 may be associated with a reverse playback direction and playback speeds that linearly increases from 2× speed to 3.5× speed. Normalized source video frame positions #0-0.47 may be associated with a forward playback direction and a playback speed of 3.5× speed. Normalized source video frame positions #0.47-0.58 may be associated with a forward playback direction and playback speeds that non-linearly decreases from 3.5× speed to 0.5× speed. Normalized source video frame positions #0.58-1 may be associated with a forward playback direction and playback speeds that linearly increases from 0.5× speed to 4× speed. Other changes in playback directions and playback speeds, and other positions of change in the source video frame positions are contemplated.

Speed ramped video frame component 110 may be configured to determine speed ramped video frames to be included in one or more speed ramped videos. The speed ramped video frames may be determined based on the playback sequence, the playback speed(s), and/or other information. Determining the speed ramped video frames may include identifying one or more playback positions in the playback sequence based on the playback speed(s) and/or other information. The playback position(s) may correspond to the speed ramped video frames. For example, speed ramped video frame component 110 may identify one or more playback positions in the playback sequence based on the playback speeds. From these playback positions, speed ramped video frame component 110 may select and/or generate one or more video frames to be included as speed ramped video frames. This may allow rendering of a new set of video frames that capture the ordering of video frames based on the playback sequence and the timing of the video frames based on the playback speeds.

Figure 8A:
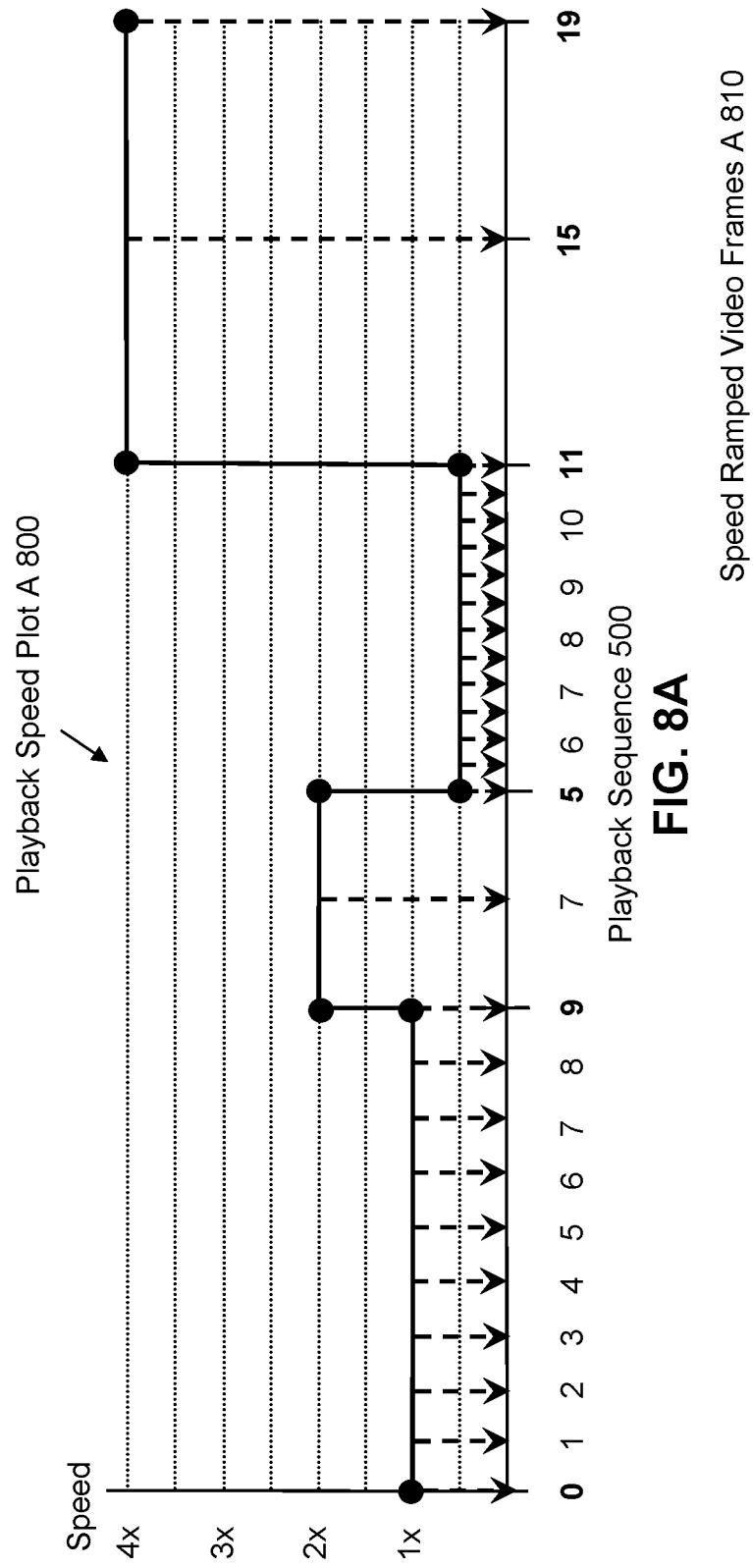
FIG. 8A illustrates an example of a playback speed plot.

For example, FIG. 8A illustrates an exemplary playback speed plot A 800. Playback speed plot A 800 may show a plot of playback speeds for video frames as a function of playback sequence 500. Speeds shown in FIG. 8A for different portions of playback sequence 500 may correspond to the speeds shown in FIGS. 7A-7B. Speed ramped video frame component 110 may identify one or more playback positions (shown in FIG. 8A as dashed arrows) in playback sequence 500 based on the playback speeds.

For example, between video frames #0-9 of playback sequence 500, one playback position may be identified for every video frame. Playback positions identified may include playback positions #0, #1, #2, #3, #4, #5, #6, #7, #8, and #9. Identifying one playback position per video frame may correspond to a playback speed of 1×.

Between video frames #9-5 of playback sequence 500, one playback position may be identified for every two video frames. Playback positions identified may include playback positions #7 and #5. Identifying one playback position per two video frames may correspond to a playback speed of 2×.

Between video frames #5-11 of playback sequence 500, two playback positions may be identified for every video frame. Playback positions identified may include playback positions #5.5, #6, #6.5, #7, #7.5, #8, #8.5, #9, #9.5, #10, #10.5, and #11. Identifying two playback positions per video frame may correspond to a playback speed of 0.5×.

Between video frames #11-19 of playback sequence 500, one playback position may be identified for every four video frames. Playback positions identified may include playback positions #15 and #19. Identifying one playback position per four video frames may correspond to a playback speed of 4×.

Figure 8B:
FIG. 8B illustrates an example of speed ramped video frames determined based on the playback speed plot shown in FIG. 8A.

FIG. 8B illustrates exemplary speed ramped video frames A 810. Speed ramped video frames A 810 may include video frames corresponding to the positions identified in FIG. 8A. Speed ramped video frames A 810 may include video frames corresponding to playback positions #0, #1, #2, #3, #4, #5, #6, #7, #8, and #9 (corresponding to playback speed of 1×); #7 and #5 (corresponding to playback speed of 2×); #5.5, #6, #6.5, #7, #7.5, #8, #8.5, #9, #9.5, #10, #10.5, and #11 (corresponding to playback speed of 0.5×); and #15 and #19 (corresponding to playback speed of 4×).

Playback positions identified by speed ramped video frame component 110 may or may not correspond to positions of video frames in the source sequence. In some implementations, determining the speed ramped video frames may include, in response to a playback position aligning with a position of a video frame in the source sequence, using the video frame in the source sequence as the speed ramped video frame. For example, in FIG. 8A, the following playback positions of playback sequence 500 may align with video frames in the source sequence: #0, #1, #2, #3, #4, #5, #6, #7, #8, #9, #7, #5, #6, #7, #8, #9, #10, #11, #15, and #19. For these playback positions, speed ramped video frame component 110 may select the corresponding video frames in the source sequence as the speed ramped video frames (e.g., selecting video frame #9 in source sequence 300 for playback position #9, etc.).

In some implementations, determining the speed ramped video frames may include, in response to a playback position not aligning with a position of a video frame in the source sequence, using multiple video frames in the source sequence to determine an interpolated video frame for the playback position. For example, for playback position #5.5, a speed ramped video frame may be interpolated using video frame #5 and video frame #6 in source sequence 300. In some implementations, one or more images may be given more weight than other images for video frame interpolation. For example, an identified playback position may include playback position #5.3. A speed ramped video frame generated for playback position #5.3 may include interpolation of video frame #5 and video frame #6 in the source sequence, where video frame #5 is given more influence over the interpolation. This may allow the interpolated video frame for playback position #5.3 to appear closer to video frame #5 than video frame #6.

In some implementations, determining the speed ramped video frames may include, in response to a playback position not aligning with a position of a video frame in the source sequence, using one of the video frames in the source sequence to determine a duplicated video frame for the playback position. For example, for playback position #6.5, a speed ramped video frame may be duplicated from video frame #6 in source sequence 300. Duplication of video frames may allow one or more video frames in source sequence 300 to appear multiple times in a row and simulate a slower playback speed. In some implementations, the speed ramped video frames may include interpolated video frames and duplicated video frames.

In some implementations, determining the speed ramped video frames may include modifying one or more of the video frames to include motion blur. Motion blur may emphasize the perceived increase in speed of playback for the visual content. For example, in FIG. 8B, speed ramped video frames corresponding to the sped-up portions of the visual content (e.g., video frames #7 and #5 corresponding to playback speed of 2×, video frames #15 and #19 corresponding to playback speed of 4×, etc.) may be modified to include motion blur. The amount of motion blur may depend on the amount of playback speed increase, with greater playback speeds corresponding to greater amounts of motion blur.

Speed ramped video component 112 may be configured to generate one or more speed ramped videos. The speed ramped video(s) may be generated based on the speed ramped video frames and/or other information. For example, speed ramped video component 112 may encode the speed ramped video frames into a new video file. The speed ramped video frames may be encoded using one or more encoding framerates (e.g., 30 frames per second, variable framerate, etc.).

While the present disclosure may be directed to videos, one or more other implementations of the system may be configured for other types media content. Other types of media content may include one or more of audio content (e.g., music, podcasts, audio books, and/or other audio content), multimedia presentations, photos, slideshows, and/or other media content.

Although processor 11 and storage medium 12 are shown to be connected to an interface 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with storage medium 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components 102, 104, 106, 108, 110, and 112 are illustrated in FIG. 1 as being co-located within a single processing unit, in implementations in which processor 11 comprises multiple processing units, one or more of computer program components 102, 104, 106, 108, 110, and/or 112 may be located remotely from the other computer program components.

The description of the functionality provided by the different computer program components described herein is for illustrative purposes, and is not intended to be limiting, as any of computer program components may provide more or less functionality than is described. For example, one or more of computer program components 102, 104, 106, 108, 110, and/or 112 may be eliminated, and some or all of its functionality may be provided by other computer program components. As another example, processor 11 may be configured to execute one or more additional computer program components that may perform some or all of the functionality attributed to one or more of computer program components 102, 104, 106, 108, 110, and/or 112 described herein.

The electronic storage media of storage medium 12 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Storage medium 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Storage medium 12 may be a separate component within system 10, or storage medium 12 may be provided integrally with one or more other components of system 10 (e.g., processor 11). Although storage medium 12 is shown in FIG. 1 as a single entity, this is for illustrative purposes only. In some implementations, storage medium 12 may comprise a plurality of storage units. These storage units may be physically located within the same device, or storage medium 12 may represent storage functionality of a plurality of devices operating in coordination.

Figure 2:
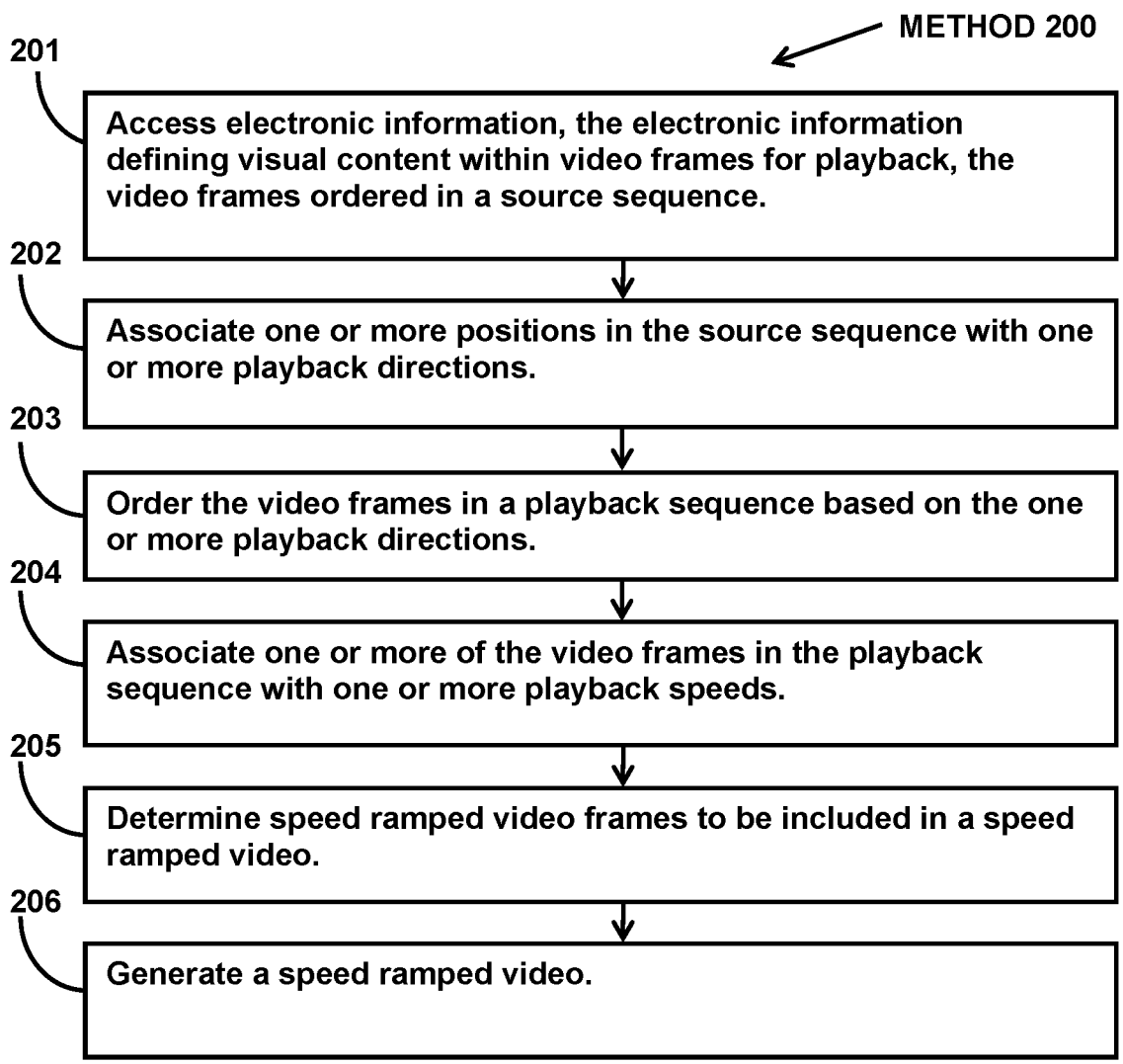
FIG. 2 illustrates a method for bidirectional speed ramping.

FIG. 2 illustrates method 200 for bidirectional speed ramping. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, electronic information may be accessed. The electronic information may be stored in a storage medium and/or other locations. The electronic information may define visual content within video frames for playback. The video frames may be ordered in a source sequence. In some implementations, operation 201 may be performed by a processor component the same as or similar to access component 102 (shown in FIG. 1 and described herein).

At operation 202, one or more positions in the source sequence may be associated with one or more playback directions. The playback directions may include a forward playback direction and a reverse playback direction. In some implementations, operation 202 may be performed by a processor component the same as or similar to playback direction component 104 (shown in FIG. 1 and described herein).

At operation 203, the video frames may be ordered in a playback sequence based on the one or more playback directions. The playback sequence may characterize a playback order in which one or more of the video frames in the playback sequence are displayed during playback. In some implementations, operation 203 may be performed by a processor component the same as or similar to playback sequence component 106 (shown in FIG. 1 and described herein).

At operation 204, one or more of the video frames in the playback sequence may be associated with one or more playback speeds. The one or more playback speeds may determine one or more perceived speeds with which the visual content is displayed during playback. In some implementations, operation 204 may be performed by a processor component the same as or similar to playback speed component 108 (shown in FIG. 1 and described herein).

At operation 205, speed ramped video frames to be included in a speed ramped video may be determined. The speed ramped video frames may be determined based on the playback sequence and the one or more playback speeds. In some implementations, operation 205 may be performed by a processor component the same as or similar to speed ramped video frame component 110 (shown in FIG. 1 and described herein).

At operation 206, the speed ramped video may be generated. The speed ramped video may be generated based on the speed ramped video frames. In some implementations, operation 206 may be performed by a processor component the same as or similar to speed ramped video component 112 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for bidirectional frame ordering, the system comprising:
one or more physical processors configured by machine-readable instructions to:
access electronic information stored in a storage medium, the electronic information defining visual content within video frames of a video for playback, the video frames ordered in a source sequence;
associate one or more positions in the source sequence with one or more playback directions based on a user setting the one or more playback directions, the playback directions including a forward playback direction and a reverse playback direction, wherein associating the one or more positions in the source sequence with the one or more playback directions includes associating a first position in the source sequence with the reverse playback direction based on the user setting the reverse playback direction for the first position in the source sequence and associating a second position in the source sequence with the forward playback direction based on the user setting the forward playback direction for the second position in the source sequence, the second position preceding the first position in the source sequence;
order the video frames in a playback sequence based on the one or more playback directions, the playback sequence characterizing a playback order in which one or more of the video frames in the playback sequence are displayed during playback, wherein ordering of the video frames in the playback sequence based on the reverse playback direction for the first position in the source sequence and the forward playback direction for the second position in the source sequence results in the playback sequence including the video frames between the first position and the second position in the source sequence ordered in reverse order followed by the video frames from the second position ordered in forward order; and
generate a new video based on the ordering of the video frames in the playback sequence, the new video generated to include the video frames within the playback sequence, the video frames ordered within the new video in accordance with the ordering of the video frames in the playback sequence.

2. The system of claim 1, wherein the source sequence characterizes a source order corresponding to a sequence in which the visual content occurred at capture.

3. The system of claim 1, wherein ordering the video frames in the playback sequence includes designating one of the video frames in the source sequence as a first video frame in the playback sequence and designating one of the video frames in the source sequence as a last video frame in the playback sequence.

4. The system of claim 1, wherein ordering the video frames in the playback sequence includes excluding one or more of the video frames in the source sequence from the playback sequence.

5. The system of claim 1, wherein ordering the video frames in the playback sequence includes designating one or more of the video frames in the source sequence in one or more playback positions in the playback sequence.

6. The system of claim 1, wherein the new video is generated further based on one or more playback speeds for one or more of the video frames in the playback sequence.

7. The system of claim 6, wherein one or more playback positions in the playback sequence are identified for inclusion in the new video based on the one or more playback speeds.

8. The system of claim 6, wherein the new video includes an interpolated video frame, the interpolated video frame determined based on at least two of the video frames.

9. The system of claim 1, wherein one or more of the video frames are modified to include motion blur.

10. A method for bidirectional frame ordering, the method performed by a computing system including one or more processors, the method comprising:
accessing, by the computing system, electronic information stored in a storage medium, the electronic information defining visual content within video frames of a video for playback, the video frames ordered in a source sequence;
associating, by the computing system, one or more positions in the source sequence with one or more playback directions based on a user setting the one or more playback directions, the playback directions including a forward playback direction and a reverse playback direction, wherein associating the one or more positions in the source sequence with the one or more playback directions includes associating a first position in the source sequence with the reverse playback direction based on the user setting the reverse playback direction for the first position in the source sequence and associating a second position in the source sequence with the forward playback direction based on the user setting the forward playback direction for the second position in the source sequence, the second position preceding the first position in the source sequence;

ordering, by the computing system, the video frames in a playback sequence based on the one or more playback directions, the playback sequence characterizing a playback order in which one or more of the video frames in the playback sequence are displayed during playback, wherein ordering of the video frames in the playback sequence based on the reverse playback direction for the first position in the source sequence and the forward playback direction for the second position in the source sequence results in the playback sequence including the video frames between the first position and the second position in the source sequence ordered in reverse order followed by the video frames from the second position ordered in forward order; and generating, by the computing system, a new video based on the ordering of the video frames in the playback sequence, the new video generated to include the video frames within the playback sequence, the video frames ordered within the new video in accordance with the ordering of the video frames in the playback sequence.

11. The method of claim 10, wherein the source sequence characterizes a source order corresponding to a sequence in which the visual content occurred at capture.

12. The method of claim 10, wherein ordering the video frames in the playback sequence includes designating one of the video frames in the source sequence as a first video frame in the playback sequence and designating one of the video frames in the source sequence as a last video frame in the playback sequence.

13. The method of claim 10, wherein ordering the video frames in the playback sequence includes excluding one or more of the video frames in the source sequence from the playback sequence.

14. The method of claim 10, wherein ordering the video frames in the playback sequence includes designating one or more of the video frames in the source sequence in one or more playback positions in the playback sequence.

15. The method of claim 10, wherein the new video is generated further based on one or more playback speeds for one or more of the video frames in the playback sequence.

16. The method of claim 15, wherein one or more playback positions in the playback sequence are identified for inclusion in the new video based on the one or more playback speeds.

17. The method of claim 15, wherein the new video includes an interpolated video frame, the interpolated video frame determined based on at least two of the video frames.

18. The method of claim 10, wherein one or more of the video frames are modified to include motion blur.

19. A system for bidirectional frame ordering, the system comprising:
one or more physical processors configured by machine-readable instructions to:
access electronic information stored in a storage medium, the electronic information defining visual content within video frames of a video for playback, the video frames ordered in a source sequence;
associate one or more positions in the source sequence with one or more playback directions based on a user setting the one or more playback directions, the playback directions including a forward playback direction and a reverse playback direction, wherein associating the one or more positions in the source sequence with the one or more playback directions includes associating a first position in the source sequence with the reverse playback direction based on the user setting the reverse playback direction for the first position in the source sequence and associating a second position in the source sequence with the forward playback direction based on the user setting the forward playback direction for the second position in the source sequence, the second position preceding the first position in the source sequence;
order the video frames in a playback sequence based on the one or more playback directions, the playback sequence characterizing a playback order in which one or more of the video frames in the playback sequence are displayed during playback, wherein ordering of the video frames in the playback sequence based on the reverse playback direction for the first position in the source sequence and the forward playback direction for the second position in the source sequence results in the playback sequence including the video frames between the first position and the second position in the source sequence ordered in reverse order followed by the video frames from the second position ordered in forward order, further wherein ordering the video frames in the playback sequence includes designating one of the video frames in the source sequence as a first video frame in the playback sequence and designating one of the video frames in the source sequence as a last video frame in the playback sequence; and
generate a new video based on the ordering of the video frames in the playback sequence, the new video generated to include the video frames within the playback sequence, the video frames ordered within the new video in accordance with the ordering of the video frames in the playback sequence.

20. The system of claim 19, wherein the new video is generated further based on one or more playback speeds for one or more of the video frames in the playback sequence.

* * * * *